July 14, 1953

M. GOTTSEGEN ET AL 2,645,392

COMBINATION VEHICULAR AND PORTABLE
FOOD AND BEVERAGE CONTAINER

Filed Feb. 15, 1952

INVENTORS:
Marten Gottsegen
Herbert N. Stein
BY

Eli Mullin
Attorney

Patented July 14, 1953

2,645,392

UNITED STATES PATENT OFFICE 2,645,392

COMBINATION VEHICULAR AND PORTABLE FOOD AND BEVERAGE CONTAINER

Marten Gottsegen and Herbert N. Stein, Chicago, Ill.

Application February 15, 1952, Serial No. 271,722

7 Claims. (Cl. 224—42.01)

This invention relates to improvements in containers of the class adapted to accommodate vacuum bottles for liquids in combination with a solid food storage compartment. More particularly the invention is directed to improvements affording a container especially adapted for removable mounting in a vehicle and for converting such a removable vehicular attachable carrier to a container which may be readily transported manually.

Heretofore the transportation of beverages and lunch foods in automotive vehicles and the like has been accomplished but haphazardly. Accordingly spilled lunches and beverages were commonplace, as were broken vacuum bottles. Oftentimes the food was not readily available, being buried beneath various articles of luggage and the like. Hence there has existed for some time a longfelt need for a compact container for foods and beverages which could be securely mounted in a readily accessible location within the seating area of a vehicle such as an automobile.

It is therefore a primary object of this invention to provide a food and beverage container which will overcome the disadvantages set forth hereinabove and will satisfy the above stated longfelt need.

Another object is to afford a portable combination food and vacuum bottle container which may be readily converted for mounting within the cab of an automobile. An object relating thereto is to provide such a container with a pair of mounting clamps with which to securely mount the container on the back of an upholstered vehicle seat.

A further object is to so construct and affix said mounting clamps to the container that such clamps may readily be converted to a convenient carrying handle.

Still another object is to afford a lunch container in which a plurality of vacuum bottles may be securely positioned in an upright rather than horizontal plane.

Still a further object is to provide a combination container having a food compartment closed by a cover which is automatically locked when the container is converted to a portable embodiment in the manner set forth hereinabove.

Yet another object is to afford a combination food and vacuum bottle container of simple, inexpensive construction yet durable and effective.

With the foregoing and other objects in view which will appear as the description proceeds, the invention consists of certain novel features of construction, arrangement and a combination of parts hereinafter fully described, illustrated in the accompanying drawings, and particularly pointed out in the appended claims, it being understood that various changes in the form, proportion, size and minor details of the structure may be made without departing from the spirit or sacrificing any of the advantages of the invention.

For the purpose of facilitating an understanding of our invention, we have illustrated in the accompanying drawings a preferred embodiment thereof, from an inspection of which, when considered in connection with the following description, our invention, its mode of construction, assembly and operation, and many of its advantages should be readily understood and appreciated.

Referring to the drawings in which the same characters of reference are employed to indicate corresponding or similar parts throughout the several figures of the drawings.

Figure 1:
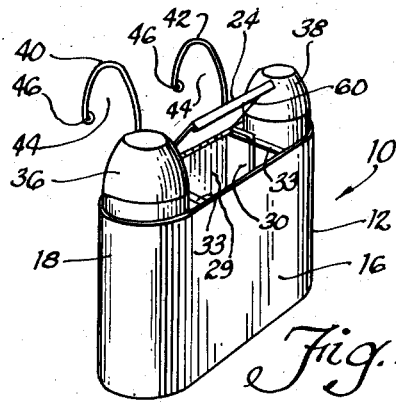
Fig. 1 is a perspective view of a combination food and beverage container embodying the principles of our invention in its automotive attachment embodiment.

Turning now to the drawings for a more detailed description of the invention, reference numeral 10 indicates generally our combination container which comprises an elongated can body 12 with straight sides 14 and 16 and curved ends 18 and 20. The body 12 is fitted with a bottom 22. A lid 24, hinged along one side as at 26, is provided for closing the central portion of the top of the can. The portion so closed may be used as a solid food compartment 29.

A pair of partition walls 28 and 30 are positioned laterally across the can 12, spaced one from the other to define the sides of the food compartment. These walls likewise cooperate with the rounded ends 18 and 20 to afford beverage-container-compartments 32 and 34 into which vacuum bottles such as 36 and 38 may be positioned in fairly snug relationship.

The partition walls 28 and 30 may be affixed within the container in any suitable manner, but we prefer to flange the side edges as at 27 and 31 so that the partition may be affixed to the insides of the sides 14 and 16 as by welding the flanged edges 27 and 31 and the like. The tops of the partition walls are also flanged inwardly to afford horizontal strips such as 33, the function of which will be disclosed as the description proceeds.

Figure 2:
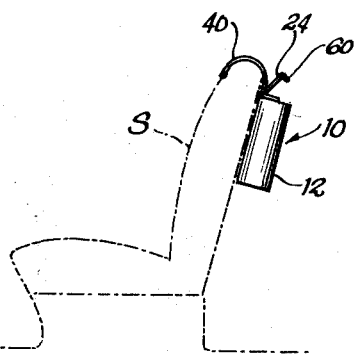
Fig. 2 is a side view of the container as mounted on the back of a typical automobile seat shown in phantom outline.

For the purpose of supporting the container 10 from the back of an automobile seat such as S, shown in dotted outline in Fig. 2, a pair of novel support clamps 40 and 42 are provided. Each of these clamps may be formed from a length of wire 43 having its upper portion bent in semi-circular shape to form a clamping segment 44 and with the ends looped as at 46 to eliminate sharp edges. A mid-portion of the wire may then be bent outwardly at an angle of ninety degrees as at 48 and again downwardly through the same angle as at 50. The bend 50 is spaced from the bend 48 a sufficient distance to afford a straight horizontal segment 52, the function of which will become apparent as the description proceeds.

The lower portion 54 of the wire is then inserted through a central opening such as 56 in the flanged horizontal top strip 33 of the partition walls 28—30. The end is then threaded through an aligned opening in the bottom 22 and headed as at 58.

The lower headed end 58 of the wire bearing against the bottom 22 of the container prevents movement of the wire in an upward direction, whereas the horizontally bent segment 52 prevents movement downwardly. Hence the wire is securely retained within the container without appreciably interfering with the freedom of rotation of the wire 43.

Figure 3:
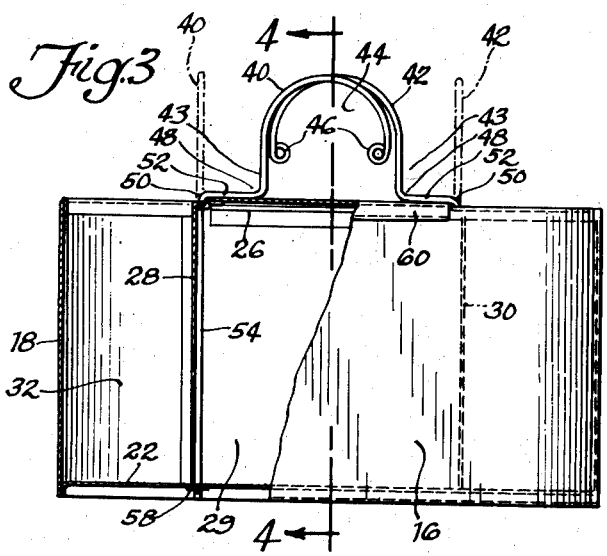
Fig. 3 is an elevational view of the container, partially in section, with the mounting clamps positioned to form a carrying handle and the seat clamping positions shown in dot-dash outline.

This freedom of rotation of the wire 43 is cleverly utilized to convert the clamping members 40 and 42 to a comfortable handle when it is desired to transform the container 10 from an automobile accessory to a portable lunch box. To do this the clamping members 40 and 42 are both rotated inwardly through an angle of ninety degrees until they meet, as shown in solid outline in Figs. 3, 4 and 5. In this position a comfortable handle is thereby provided for the container.

Referring once more to the lid 24 it will be noted that the free edge of the lid is bent downwardly to afford a flange 60 which may be further folded back on its own axis so that it bears against the side 16 in substantial frictional relationship. This frictional relationship ordinarily is sufficient to keep the lid of the food compartment 29 closed, but to insure closure of the compartment during its use as a portable lunch box, the horizontally bent segments 52 of the handles are provided. As will be readily perceived in Fig. 3 of the drawings, the rotation of the clamps 40 and 42 to the handle position likewise moves the segments 52 to the position indicated so that they bear against the top of the lid securely locking the same. Furthermore this bending of the wire 43 enables the clamps 40 and 42 to swing fully free of the container so that the backwall 14 may bear directly against the seat S when converted back to the automobile accessory.

Figure 4:
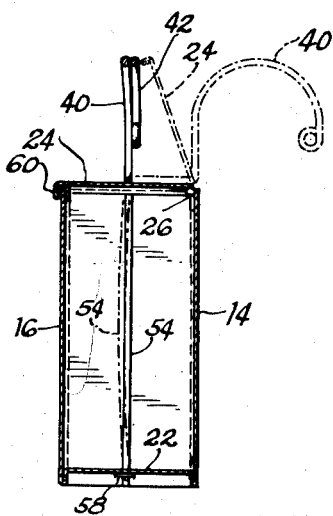
Fig. 4 is an elevational view in section taken on the plane of line 4—4 in Fig. 3, viewed in the direction indicated and with the open cover position also shown in invisible outline.
Figure 5:
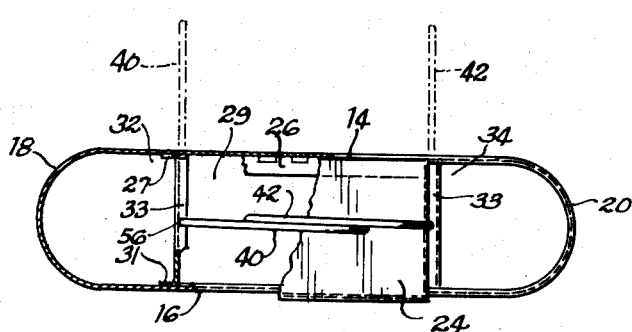
Fig. 5 is a top plan view of the container as illustrated in Figs. 3 and 4 of the drawings.

Attention is again now directed to the wire segment 54 as shown in Fig. 4 of the drawings. It will be noted that this segment is slightly bowed out so that when the wires 43 are in the handle-carrier position the bowed portions bear against the partition walls 28 and 30. This, of course assists in preventing the accidental rotation of the wires from the carrier position.

The embodiment chosen for illustration is constructed from sheet metal, but it should be apparent that any suitable material of construction such as wood, plastic, rubber and the like may be utilized without departing from the scope of our invention.

It is believed that our invention, its mode of construction and assembly, and many of its advantages should be readily understood from the foregoing without further description, and it shold also be manifest that while a preferred embodiment of the invention has been shown and described for illustrative purposes, the structural details are nevertheless capable of wide variation within the purview of our invention as defined in the appended claims.

What we claim and desire to secure by Letters Patent of the United States is:

1. A portable container comprising an elongated enclosure having rounded ends and substantially straight sides, a bottom fitted within said enclosure, vertical partitions positioned transversely in spaced relationship one with the other within said container, to afford three compartments, each of said partitions formed with a horizontally flanged portion at the top, a cover hingedly mounted for closing at least one of said compartments, a pair of wire members threaded through aligned openings in said flanged portions and said bottom, each of said wire members having its top end portion bent in semi-circular shape affording a clamp, an intermediate portion of each wire member positioned horizontally for locking the center one of said compartments, said wire members rotatable to a position wherein said semi-circular bent top portions are adjacent each other, and a pair of vacuum bottles removably positioned one in each end compartment.

2. A food and beverage combination carrier and server comprising a compartmented housing and at least one removable vacuum bottle, a cover hinged to the top of one of said compartments, a pair of clamps for suspending said server in a vehicle, each of said clamps formed at one end of a length of wire, the other end of said wires rotatably mounted within said housing, said lengths of wire rotatable in a horizontal plane within an arc of at least ninety degrees, intermediate segments of each of said wires bent in a substantially horizontal plane, said clamps cooperating to form a carrying handle when each of the wires is rotated through an arc of substantially ninety degrees, and said horizontal segments serving to lock the cover over said compartment.

3. In a portable food and beverage carrier comprising a compartmented housing with a cover for at least one of said compartments hingedly secured at one side of the housing; a pair of horizontally rotatable handles pivoted at the top of and substantially on the medial line of said housing at opposite sides of said covered compartment, said one side being substantially parallel with said medial line, said handles having horizontally bent portions extending toward one another when in one position with the bent portions overlying and engaging upon the cover to lock the same upon said covered compartment, and said bent portions having upwardly directed extensions on the ends thereof and said extensions terminating at their upper ends in curved portions coinciding when in said one position of said handles, and said handles being adapted when rotated approximately 90° to form hook-shaped parallel clamps on one side of said housing with the horizontally bent portions disengaged from said cover.

4. A carrier as described in claim 3 in which the length of said bent portions is substantially the same as the distance from the pivot points of said handles to a side of the housing perpendicular to said opposite sides whereby when the handles are in said last mentioned rotated condition, said last mentioned side and said upwardly directed extensions are in substantially the same plane.

5. A victual carrier of the character described which includes a vertically arranged housing having at least a pair of opposite parallel planar sides, and having a generally rectangular top opening, a cover member hingedly secured along a top edge of the opening, a pair of rod-like handles pivotally mounted to the top of said housing centrally of the opposite edges of said opening which coincide generally with the upper ends of said opposite planar sides, each handle being rotatable at least 90° about a vertical axis between two positions, each having a horizontally bent portion extending inwardly of the opening and overlying the cover member when in one of said positions, and the horizontally bent portions terminating at their inner ends in upwardly directed extensions having hook portions curving toward one another but coinciding when in said one position, said handles being adapted when rotated to the second of said positions to form hook-shaped clamps with the horizontally bent portions substantially parallel with said opposite sides and disengaged from said cover member.

6. A carrier as described in claim 5 in which each of said handles has an elongate portion below the said opening and alongside the respective opposite sides, and said elongate portions have deformations therein the planes of which are parallel with the respective planar sides when the handles are in said one position whereby to bear against the said sides and resist rotation of the said handles.

7. In a portable food and beverage carrier comprising a housing with a cover hingedly secured at one side of the housing; a pair of horizontally rotatable handles pivoted at the top of and substantially on the medial line of said housing at opposite ends thereof, said handles having horizontally bent portions extending toward one another when in one position with the bent portions overlying and engaging upon the cover to lock the same, and said bent portions having upwardly directed extensions on the ends thereof and said extensions terminating at their upper ends in curved portions coinciding when in said one position of said handles, and said handles being adapted when rotated approximately 90° to form hook-shaped parallel clamps on one side of said housing with the horizontally bent portions disengaged from said cover.

MARTEN GOTTSEGEN.
HERBERT N. STEIN.

References Cited in the file of this patent

UNITED STATES PATENTS

| Number | Name | Date |
|---|---|---|
| 433,452 | Dorsch | Aug. 5, 1890 |
| 594,686 | Ferber | Nov. 30, 1897 |
| 823,071 | Nelson | June 12, 1906 |
| 1,033,704 | Jones | July 23, 1912 |
| 1,383,324 | Martell | July 5, 1921 |
| 1,471,953 | Gallagher | Oct. 23, 1923 |
| 1,532,016 | Wright | Mar. 31, 1925 |
| 1,620,941 | Brainard | Mar. 15, 1927 |
| 1,625,038 | Love | Apr. 19, 1927 |
| 1,728,521 | Anderson | Sept. 17, 1929 |
| 1,925,523 | Cuff et al. | Sept. 5, 1933 |
| 2,585,742 | Condon | Feb. 12, 1952 |

FOREIGN PATENTS

| Number | Country | Date |
|---|---|---|
| 591,868 | Great Britain | Sept. 1, 1947 |